Nov. 19, 1940.  E. W. TURNER  2,221,747
WHEEL BALANCE WEIGHT
Filed March 1, 1939  2 Sheets—Sheet 1
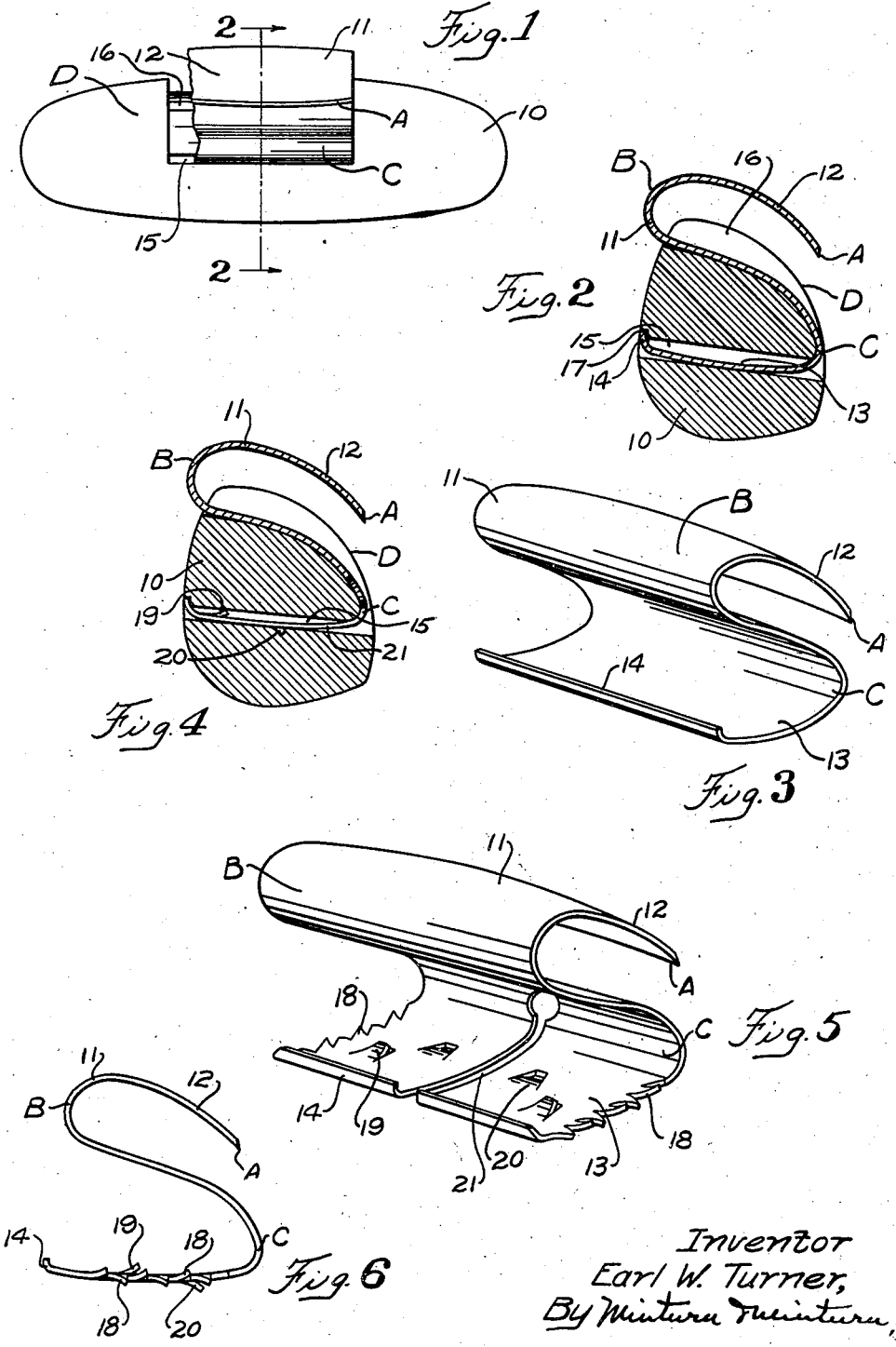
Inventor
Earl W. Turner,
By Minturn & Minturn,
Attorneys

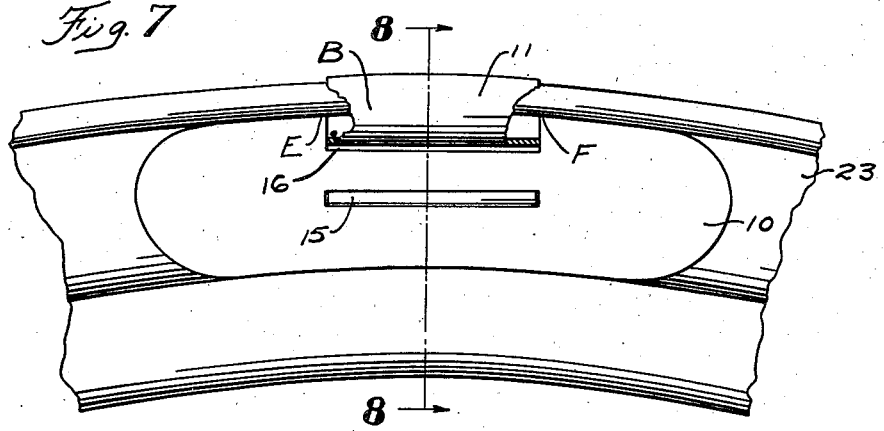
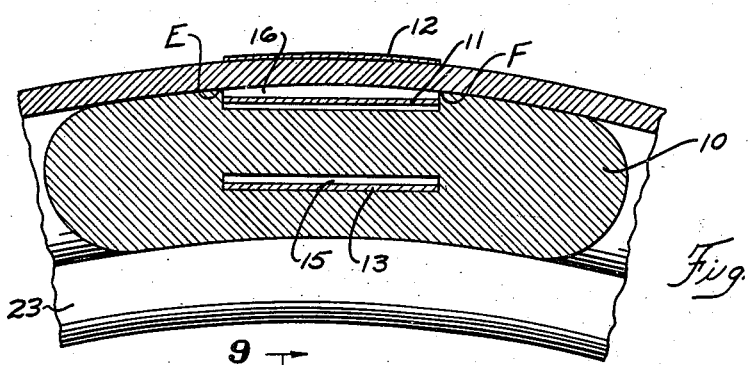
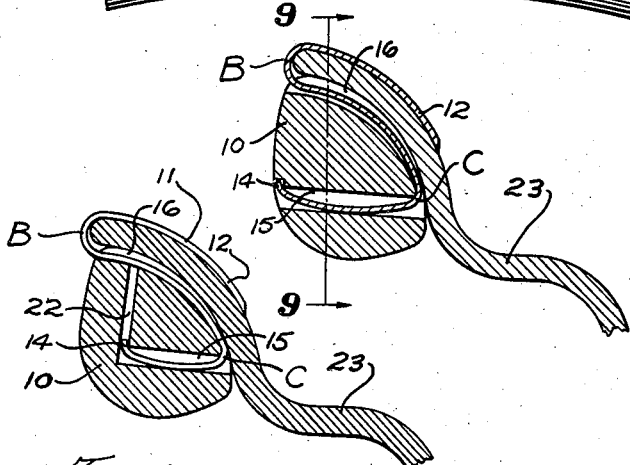

Patented Nov. 19, 1940

2,221,747

UNITED STATES PATENT OFFICE 2,221,747

WHEEL BALANCE WEIGHT

Earl W. Turner, Kokomo, Ind., assignor of one-third to Ellen E. Turner, one-sixth to Earl W. Turner, trustee for John E. Turner, one-sixth to Earl W. Turner, trustee for Helen C. Turner, and one-third to Earl W. Turner Application March 1, 1939, Serial No. 259,183

11 Claims. (Cl. 301—5)

This invention relates to wheel balancing weights of that type particularly adapted for use in balancing automotive wheels. A primary object of this invention is to provide a two piece weight consisting of the weight proper and an attaching clip in such form that the weight and clip may be produced individually and separately one from the other and later assembled by a simple operation such as pressing the two pieces together.

A further important object of the invention is to provide a balance weight structure of the above indicated type which will lend itself to extremely rapid and low cost production and yet at the same time will produce a safe weight not liable to be easily removed, particularly in use, from the rim of the wheel or which will have the parts separate one from the other.

The weight herein referred to is of that type which has a spring member carried by the weight to engage over the lip of a tire rim so as to bring the weight up snugly against the outer side of the tire rim while the clip portion extends over onto the inside of the rim between the rim and the side wall or bead of the tire mounted on the rim.

These and other important objects and advantages of the invention will become apparent to those versed in the art in the following description of the invention as illustrated in the accompanying drawings, in which Fig. 1 is a rear elevation of a weight embodying the invention;

Fig. 2, a transverse section on enlarged scale on the line 2—2 in Fig. 1;

Fig. 3, a front view in perspective of the weight clip on enlarged scale;

Fig. 4, a transverse section similar to that in Fig. 2 but showing a modified form of clip;

Fig. 5, a front view in perspective of the modified form of clip employed in the structure shown in Fig. 4;

Fig. 6, an end elevation of the clip shown in Fig. 5;

Fig. 7, a front or outside view in elevation of the weight mounted on a tire rim;

Fig. 8, a transverse section on the line 8—8 in Fig. 7;

Fig. 9, a longitudinal section on the line 9—9 in Fig. 8; and

Fig. 10, a transverse section similar to that in Fig. 2 but showing a modified form of foot terminal.

Like characters of reference indicate like parts throughout the several views in the drawings.

Referring first to that form of the invention as illustrated in Figs. 1, 2, 3, 7, 8, and 9, the assembled weight consists of the weight 10 proper and its mounting clip 11. The clip 11 is made out of suitable steel which may be initially formed to the desired shape and later heat treated or tempered to give it the required resiliency. In this form, a cross section through the clip 11 will show a generally S-shape. In this shape there will be shown the rim tongue 12 which curves upwardly and outwardly from an inner free end A and bends around in an approximate U-shape about the bend B and continues inwardly in spaced relation from and below the tongue 12 and downwardly to a second bend C, from which bend a foot 13 extends forwardly with a slight upward curve to terminate in an outer end, at least a part of which is turned upwardly in a terminal flange 14, the flange 14 being herein shown, Fig. 3, as extending along the entire width of the foot 13.

The weight 10 is formed out of any suitable metal, preferably of a metal having a very high weight per unit volume such as lead or an alloy of lead, antimony to a limited extent being a part of the alloy. Brass, of course, may be employed. It is not the intention to limit the invention to any particular metal or material. The essential feature in regard to the material is that it have sufficient weight to accomplish the balancing required. In many cases a multiple number of weights may be required to effect the required balance.

In any event the metal selected may be formed to the desired shape by the simple and well-known processes of molding including the simple pouring into molds or the usual and well-known die-casting processes. The invention lends itself admirably to the die-casting process.

The weight 10 is formed in any one of the desired sizes (it being understood that the weights will be made in varying sizes such as from one-half ounce on up through six or seven ounces) to have an inner face D conforming to the outer face of the rim so that a close fit between those members will be had. A central slot or passageway 15 is provided to extend entirely transversely through the weight 10. From the rear end of this slot 15 is carried a recess 16 upwardly and across the top side of the weight. The length of the slot 15 and the recess 16 is made to be such that the clip 11 may have its foot 13 entered in the slot 15 and the portion from B to C received within the recess 16.

The clip 11 is attached to the weight 10 by first entering the foot 13 by its flanged end into the slot 15 and the clip is then forced into position to carry the flange 14 on through the slot 15 to have the flange 14 snap upwardly into a longitudinal recess 17. The vertical height of the slot 15 is made to be such that when the foot 13 is entered therein and the flange 14 seated in the recess 17, the foot 13 will remain deformed, that is it will be carried toward a flatter shape than in its original free shape. When the foot 13 is thus positioned within the slot 15, the portion of the clip 11 extending around and upwardly from the bend C will be in contact with the floor of the recess 16 substantially throughout its entire area. It is to be noted that this upwardly and outwardly extending portion of the clip is below the upper and inner surface of the weight 10. The clip 11 when thus seated in the weight 10 is held firmly against any further relative movement with the weight and a secure attachment is thereby obtained.

In the form of the invention as shown in Figs. 4, 5 and 6, the clip 11 is further shaped to have barbs 18 along the lateral edges of the foot 13, these barbs being alternately bent upwardly and downwardly, resembling somewhat the teeth of a saw. The barbs in this respect are sloped rearwardly. Also there are provided upwardly and downwardly turned tongues 19 and 20 respectively, both being inwardly directed.

The purpose of the barbs 18 is to permit engagement of these barbs through the end walls of the slot 15 when the foot 13 is pressed therethrough. In order to promote such engagement, the foot 13 is preferably slotted, such as by the slot 21, to permit lateral flexing of the two portions of the foot so that when the foot 13 is forced through the slot 15, the barbs may slide along the end walls of the slot without any material effect thereon, but any tendency for reverse travel will tend to have the two portions of the foot elastically pushed laterally and urge the barbs 18 to embed their sharpened points into these end walls. The clip, of course, as above described, is tempered to be in the nature of a spring so that when the two portions of the foot 13 are initially urged one toward the other during the insertion of the foot 13 into the slot 15, there will be a pressure continually exerted by tendency of these two foot portions to return to their normal positions.

While the flange 14 in this particular form of the invention where the barbs 18 are employed, may be dispensed with, it still serves as a secure locking means if desired. Where the flange 14 is omitted, the slot 15 may be closed on the outer side of the weight so as to be invisible from that side. The upwardly and downwardly turned tongues 19 and 20 tend to bite into the upper and lower walls of the slot 15 upon any tendency of the foot 13 to travel outwardly these tongues 19, 20 engaging with the relatively soft metal of the weight simultaneously with engagement of the barbs 18.

As indicated in Fig. 10, either one or both of the forms of the clip above described may be employed in an outer closed end slot 15. In this case, the flange 14 may spring upwardly to engage within an internal slot 22 formed in the original molding of the weight by carrying a slot downwardly from the floor of the recess 16 to intercept the slot 15. While this form is a little more difficult to handle in the molding operation, it nevertheless provides a form that leaves a smooth closed outer surface and eliminates the showing of the open end of the slot illustrated in Fig. 7.

In either form of the invention, the weight is applied to the rim 23 by engaging the overhanging lip of the rim between the weight and the tongue 12 of the clip and then forcing the weight back against the rim to carry the tongue 12 on down over the inner face of the rim to seat the weight snugly against the outer face, as indicated in Fig. 8. The distance between the upper, inner face of the weight 10 and the under side of the tongue 12 is made to be initially less than the thickness of the tire rim to be engaged therebetween. Thus when the weight is forced into position, there will be a bending action set up in the clip taking place at both bends B and C. The parts are proportioned as between the weight and the clip to have the gripping action over the rim take place between the under side of the clip tongue 12 and the upper and inner face of the weight 10, as particularly illustrated in Figs. 8 and 9. Referring to Fig. 9, it is to be noted that the tongue 12 is in substantial contact with the upper and inner face of the tire rim flange while the portion of the clip 11 under that flange is spaced below and out of contact with the rim. The shoulders E and F of the weight itself contact with the under side of the tire rim flange. Thus it is to be seen that the gripping action is between the steel tongue 12 and the softer metal of the weight 10. The relatively soft metal of the weight gives a good frictional engagement with the tire rim exceeding that which would otherwise be had between two steel portions. Also it is to be noted that by carrying the part of the clip between the bends B and C within the recess 16, and not having this portion of the clip anchored against movement, the clip may bend over an exceedingly great area and thereby have the resistance of bending of two bends rather than of one bend only in producing the grip over the tire rim flange. This not only gives a better grip but also prevents undue distortion of the clip and thereby promotes a greater degree of safety in the use of the device.

While I have herein shown and described my invention in the best form as now known to me, it is obvious that structural changes may be employed without departing from the spirit of the invention and I, therefore, do not desire to be limited to that precise form beyond the limitations as may be imposed by the following claims.

I claim:

1. A wheel and tire balance weight of the tire rim engaging type comprising a spring clip having a rim engaging tongue, a foot, and a leg interconnecting the tongue and foot, and a weight having a passageway of greater cross-sectional area than that of said foot entering therein, said foot being positioned and maintained in said passageway by elastically engaging the weight between opposing portions of the foot, said weight having a rim side face and a recess entering the weight from that face, and said leg being wrapped across the weight from said foot through said recess to carry said tongue across the weight spaced therefrom a distance normally less than the thickness of the rim to which the weight is to be applied.

2. In a wheel balancing weight of the tire rim engaging type, a spring clip having a rim engaging tongue, a leg extending from the tongue, a foot extending by a bend from the leg, a weight having a passageway entering therein with a transverse dimension greater than the thickness of said foot, said foot being positioned within said passageway to have said bend abut said weight, a shoulder at the end of said passageway removed from said bend, a lip on the end of said foot engaged over said shoulder, and said foot having a portion bent in the direction of said dimension intermediate said bend and said lip contacting with a wall of said passageway in opposition to said bend and said lip to maintain said bend and said lip in compressive engagement about a portion of the weight therebetween.

3. In a wheel balancing weight of the tire rim engaging type, a spring clip having a rim engaging tongue, a foot carried by the tongue, a weight having a hole entering therein of a greater transverse dimension than the thickness of said foot, said foot being positioned within said passageway, and said foot being bowed longitudinally within the hole to have longitudinally spaced apart opposing engagements therewith.

4. In a wheel balancing weight of the tire rim engaging type, a spring clip having a rim engaging tongue, a foot carried by the tongue, a weight having a passageway entering therein of a greater transverse dimension than the thickness of said foot, said foot being positioned within said passageway, and said foot being bowed longitudinally within the passageway to have longitudinally spaced apart opposing engagements therewith, a shoulder across the passageway, and a lip on said foot engaged over the shoulder.

5. In a tire and wheel balancing weight, a spring clip having a rim engaging tongue, a leg extending from the tongue, a foot on the leg, a weight having a transverse passageway of greater height than the thickness of the foot, said foot being positioned within the passageway and bent to engage said weight at opposite points for securing the weight to said clip, a shoulder across said passageway removed from the foot entering end, a lip on the foot engaged over the shoulder, and said foot being bent into contact with that side of the passageway opposite to the shoulder side.

6. In a wheel balancing weight of the tire rim engaging type, a spring clip having a rim engaging tongue, a foot carried by the tongue, a weight having a passageway with a transverse dimension thereof greater than the corresponding transverse dimension of said foot, said foot being positioned within said passageway and shaped to engage said weight at opposite points transversely across said passageway, said foot being longitudinally bifurcated, and teeth on the outer edges of said foot engaging with the walls of said passageway.

7. In a wheel and tire balance weight, a spring clip having a foot, a weight having a passageway entering therein, said foot being positioned in said passageway, and said foot having portions thereof with weight clearance therebetween in opposing engagement with the walls of said passageway, and said foot being a spring maintained in a distorted condition by said engagement, said foot being bifurcated to form a pair of oppositely biased spring-like tongues, and teeth on said tongues for engagement with the walls of said passageway.

8. In a wheel and tire balance weight, a spring clip having a foot, a weight having a passageway entering therein, said foot being positioned in said passageway, and said foot having portions thereof with weight clearance therebetween in opposing engagement with the walls of said passageway, and said foot being a spring maintained in a distorted condition by said engagement, said foot being bifurcated to form a pair of oppositely biased spring-like tongues, and teeth on said tongues for engagement with the walls of said passageway, a turned over lip on the end of each of said tongues, and a shoulder across said passageway over which shoulder said lips engage.

9. In a wheel and tire balance weight, a spring clip having a foot, a weight having a passageway entering therein, said foot being positioned in said passageway, and said foot having portions thereof with weight clearance therebetween in opposing engagement with the walls of said passageway, and said foot being a spring maintained in a distorted condition by said engagement, said foot having a bend at its entrance into said passageway abutting the weight, a shoulder across the passageway, and a lip on the foot engaging over the shoulder, said foot distortion maintaining said bend and said lip in opposing engagement on said weight through said passageway.

10. In a wheel and tire balance weight of the tire rim engaging type, a spring clip having a tongue, a leg bent and extending in spaced relation from the tongue, and a foot extending from the tongue, and a weight in which said foot is secured, said weight having a rim contacting face and a recess through and across said face, said leg extending through said recess below said face and carrying said tongue across and in spaced relation from said face, the spacing of the tongue from the face being normally less than the thickness of the rim to be engaged.

11. In a wheel and tire balance weight, a spring clip having a foot, a weight having a hole entering therein and receiving said foot in said hole, and said foot being arched across said hole into at least three zones of contact with the weight, and said foot being of spring-like nature maintained in a distorted condition by engagement through said contacts with the walls of the hole.

EARL W. TURNER.